United States Patent
Li et al.

(10) Patent No.: US 8,120,568 B2
(45) Date of Patent: Feb. 21, 2012

(54) SOURCE DRIVER STRUCTURE FOR DISPLAY AND OUTPUT CONTROL CIRCUIT THEREOF

(75) Inventors: Ming-Xian Li, Longtan Township, Taoyuan County (TW); Chiao-Lin Huang, Bade (TW)

(73) Assignee: Chunghwa Picture Tubes, Ltd., Bade, Taoyuan County (TW)

( * ) Notice: Subject to any disclaimer, the term of this patent is extended or adjusted under 35 U.S.C. 154(b) by 525 days.

(21) Appl. No.: 12/424,385

(22) Filed: Apr. 15, 2009

(65) Prior Publication Data
US 2010/0103315 A1    Apr. 29, 2010

(30) Foreign Application Priority Data
Oct. 28, 2008   (TW) ............................. 97141416 A

(51) Int. Cl.
G09G 3/36    (2006.01)
(52) U.S. Cl. .......................... 345/100; 345/87; 348/500
(58) Field of Classification Search .................. None
See application file for complete search history.

(56) References Cited

U.S. PATENT DOCUMENTS

| | | | | |
|---|---|---|---|---|
| 7,755,587 B2* | 7/2010 | Kumagai et al. | ............... | 345/98 |
| 7,852,305 B2* | 12/2010 | Tsai | ............... | 345/98 |
| 7,978,162 B2* | 7/2011 | Maruoka et al. | ............... | 345/87 |
| 2003/0006979 A1* | 1/2003 | Tsuchi et al. | ............... | 345/204 |
| 2005/0001825 A1 | 1/2005 | Huang | | |
| 2007/0085801 A1* | 4/2007 | Park et al. | ............... | 345/98 |
| 2007/0171179 A1* | 7/2007 | Morosawa | ............... | 345/100 |

* cited by examiner

Primary Examiner — Jason Olson
(74) Attorney, Agent, or Firm — Muncy, Geissler, Olds & Lowe, PLLC

(57) ABSTRACT

The present invention discloses an source driver circuit scheme for displayer, which comprises a shifter register to register data signal, a line buffer coupled with said shifter register to latch the data signal, a level shifter coupled with line buffer to level output electrical potential, a digital-to-analog converter (DAC) to convert digital signal to analog signal, an output buffer coupled with said digital-to-analog converter (DAC) to output converted signal, and an output control circuit coupled with output buffer. Said output control circuit comprises a D flip-flop and CMOS switching element to output a LP_out signal and control the data signal output of the source driver IC to avoid the power-on noise of the displayer.

5 Claims, 5 Drawing Sheets

SOURCE DRIVER STRUCTURE FOR DISPLAY AND OUTPUT CONTROL CIRCUIT THEREOF

FIELD OF THE INVENTION

The present invention generally pertains to an output control circuit for the source driver in panel displayer, more particularly, relates to an output control circuit to eliminate the power-on noise of panel displayer.

DESCRIPTION OF THE PRIOR ART

Recently, due to the remarkable advancing and prosperous development in image display technology, most of the traditional cathode ray tube (CRT) displayer has been replaced by the so called panel displayer. The panel displayer has the advantages of small size, thin thickness, light weight, low power consumption, and low radiation in comparison with the bulky CRT displayer and thereby becomes the dominant technology of the image displayer in current generation. Nowadays, the thin-film transistor liquid crystal displayer (TFT-LCD) is the most common flat panel displayer in the market, the other flat panel displayers such as the one utilizing light emitting diode (LED) or plasma technology become more and more with the plummeting prices. The display unit of the flat panel displayer is constructed by a plurality of pixel units, wherein the pixel units are generally arranged in array configuration and controlled by the driver circuit to drive the corresponding pixel units based on the rasterizing image data. The LCD displayer uses a plurality of driver circuit disposed on the panel to applied different voltage altering the arrangement of liquid crystal cell within the panel in either upright or twisted orientation. The arrangement of liquid crystal cell defines the light gate to determine the transmissivity of the backlight source to the screen and construct the entire image frame. The primary function of the driver circuit in LCD displayer is to receive the instruction and image signal from the control circuit of displayer. The signal is driven by the process of digital-to-analog conversion to output the voltage required by each pixel to determine the twisted degree of liquid crystal cells. Each pixel has different color and gray scale performance constructing a full-color image. Accordingly, the driver circuit is an essential component in the industry of LCD displayer.

Generally, each pixel of LCD panel is provided with two input ends to couple respectively with two different driver circuits, one is the source driver circuit disposed laterally along the X axis of LCD panel, one is the gate driver circuit disposed longitudinally along the Y Axis of LCD panel, wherein source driver circuit is a component having high-frequency characteristics and display function used to transmit the image data to LCD panel and control the data input. The manufacture of source driver circuit requires the analog-to-digital technology whose design is much complicated. On the other hand, the gate driver circuit decides the position to display the image and inform each row of pixel to implement the data input process including the step of indicating the switch state (ON/OFF) of the transistor, deciding the twisted angle and speed of the liquid crystal cell, thus it's manufacturing process is more difficult. The switch state of each pixel electrode in the LCD panel determines whether the image signal of computer or television can be displayed exactly on the panel. Generally, the switch of pixel in the LCD panel is controlled by a corresponding transistor. The driver circuit is configured to receive all kinds of instruction outside and to decide the voltage which should be applied on the corresponding transistor for controlling the twisted degree and displaying proper images.

FIG. 1 illustrates a fundamental source driver circuit diagram with 642 output channels. As shown in the drawing, the output portion of source driver circuit 100 generally includes a digital-to-analog converter (DAC) 101, operating amplifier (OP) 103, and an inverted MOSFET (Metal Oxide Semiconductor Field Effect Transistor) 105. In the figure, DAC 101 is coupled with multiple graded voltage V1~V14 and a polarity signal (POL). DAC 101 is used to convert the inputted digital data signal into analog data signal. The graded voltage V1~V14 may be the gamma correction voltage ($V_{gma}$) to provide gray scale value (for example, 14 bits in this embodiment) for each corresponding pixel. The data signal is driven by an operating amplifier 103 to the received $V_{gma}$ level for controlling the gray scale performance of each pixel; The POL signal is used to control the polarity (+/−) and polarity reversal of the signal in pixel unit. The data signal driven by operating amplifier 103 is transmitted to an inverted MOSFET 105 coupled therewith. A latch pulse signal (LP signal) is used by LCD displayer to control the switch of the output buffer, i.e. the inverted MOSFET 105. Generally, the reset of the DAC 101 is not implemented when the LCD displayer power-on, thus all data signal therefrom are set in unknown state either in high level (H) or in low level (L). In addition, the LP signal is in low level during the initial power-on (initial L), therefore the inverted MOSFET will be set in ON state after the power-on of LCD displayer, the operating amplifier outputs unknown signal voltage to each channel 107, i.e. the data line connected to thin-film transistor in the pixel portion. The output signal is unstable random data at this time causing the LCD displayer to display random pattern when the power-on, which is the so called power-on noise issue in the LCD displayer.

Conventionally, a NAND gate is provided into the line latch portion of the source driver circuit to solve the power-on random noise issue in LCD displayer by delaying the rising edge of initial power signal a specific time with respect to the power signal of source driver circuit. However, a large number of NAND gate are required to achieve this purpose in the source driver IC thereby increasing the manufacturing cost. Further, the surface configuration of additional NAND gates in this approach would occupy large surface area of LCD panel, which is quite unsuitable in the current industry.

Additionally, the United State public patent number 20050001825 discloses a noise suppressing method for the power on/off of the flat panel displayer. A signal detecting circuit and an image signal processor are provided in the timing control device of the panel displayer. Once the LCD displayer is power on, the signal detecting circuit in the timing control device detects if the signal is stable. If the unstable signal is detected, the image signal processor will cause the driving circuit to send out the black frame signal, which is so called black frame insertion method. Although the approach of inserting the black image into the power-on signal when LCD is power-on may suppress the power-on noise and eliminate the shadow, the driver circuit of the LCD displayer must cooperate with the timing control device to implement this function. Furthermore, the disposition of additional detecting circuit and image signal processor not only require the alteration of the original circuit design, but also increases the production cost.

The power-on noise and unstable signal is a conventional problem in the industry of LCD displayer, the approach disclosed in prior art may need to provide numerous additional components, or whose circuit design is too complicated to implement. Therefore, a novel driver circuit for LCD displayer is eagerly desired to solve the above-mentioned issues.

SUMMARY OF THE INVENTION

In the light of the foregoing description, the present invention discloses a source driver circuit structure including a shift register, a line buffer, a level shifter, a digital-to analog converter, a output buffer, and a output control circuit. The output control circuit is coupled with the output buffer to control the output from said output buffer.

The present invention also discloses an output control circuit for solving the displayer power-on noise issue by controlling the data signal output of source driver circuit. The output control circuit in present invention includes a positive edge-triggered flip-flop and a MOSFET switch element. The original LP (latch pulse) signal of source driver circuit is inputted from the input end of switch element to a flip-flop and generates a LP delay signal. The LP delay signal control the ON/OFF of the transistor in MOSFET switch element to output a LP output signal, subsequent controlling the switch between the source driver IC and the display channel (data line).

One aspect of present invention is to provide a source driver structure with output control circuit to control the switch of the output buffer.

Another aspect of present invention is to provide an output control circuit for source driver to transform the original LP signal of the source driver circuit into LP output signal. The LP output signal is set in high level in a predetermined delay time to turn off the switch between the source driver circuit and the display channel thereby inhibiting the data signal from outputting; The LP output signal becomes the original LP signal of source driver circuit after a predetermined delay time to turn on the switch between said source driver circuit and display channel thereby outputting the data signal.

The object of present invention is to provide a source driver structure to solve the power-on noise in the art without additional production cost in comparison with the conventional source driver circuit.

Another object of present invention is to provide an output control circuit for transforming the first clock signal with low initial level into the second clock signal with high initial level to be output to the source driver circuit.

The forgoing forms and other forms, objects, and aspects as well as features and advantages of the present invention will become further apparent from the following detailed description of the presently preferred embodiments, read in conjunction with the accompanying drawings. The detailed description and drawings are merely illustrative of the present invention rather than limiting the scope of the present invention being defined by the appended claims and equivalents thereof.

DESCRIPTION OF THE PREFERRED EMBODIMENT

The invention will now be described in greater detail with preferred embodiments of the invention and illustrations attached. Nevertheless, it should be recognized that the preferred embodiments of the invention is only for illustrating. Besides the preferred embodiment mentioned here, present invention can be practiced in a wide range of other embodiments besides those explicitly described, and the scope of the present invention is expressly not limited expect as specified in the accompanying Claims.

Figure 1:
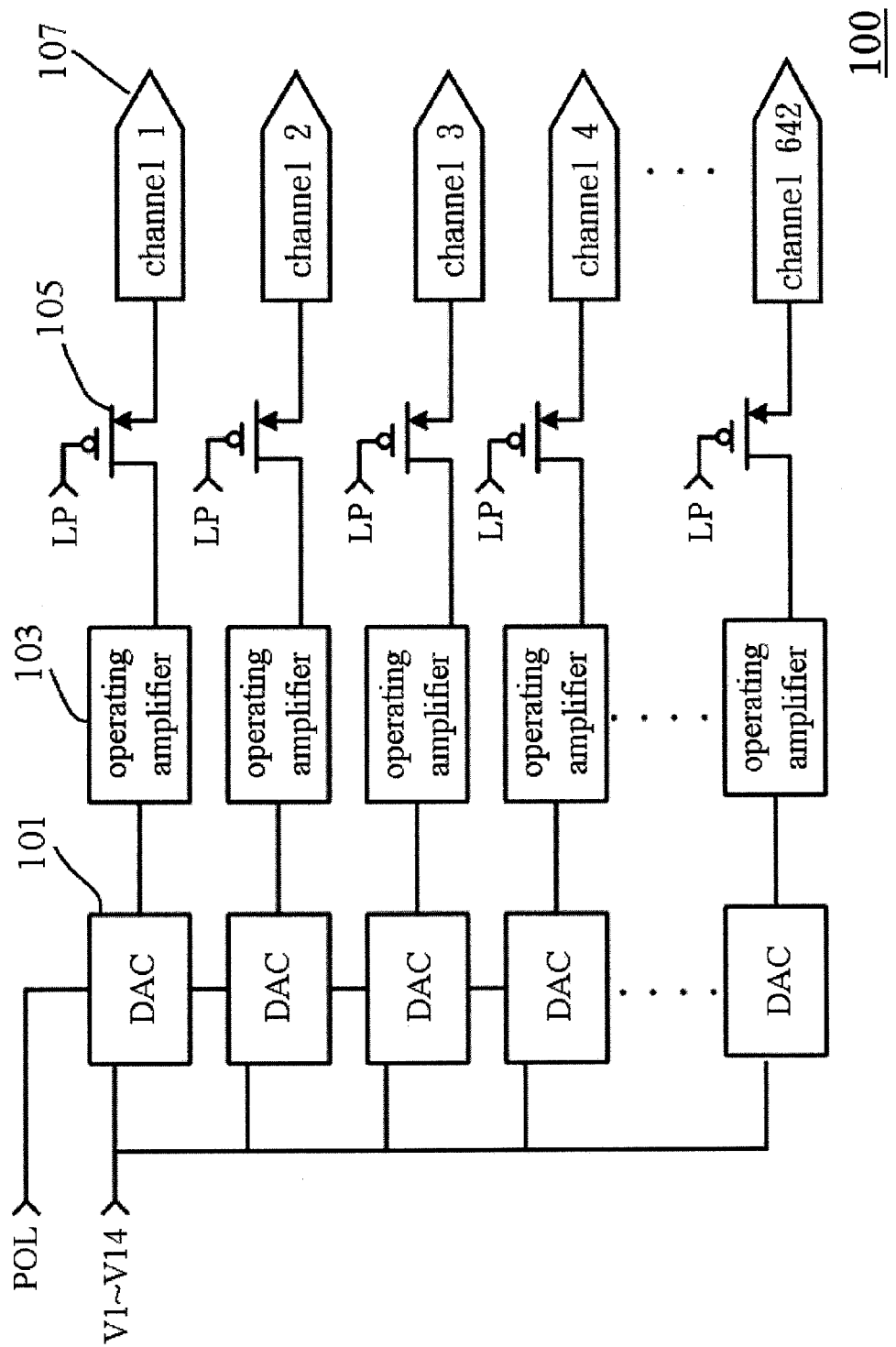
FIG. 1 illustrates a fundamental source driver circuit diagram with 642 output channels in prior art.
Figure 2:
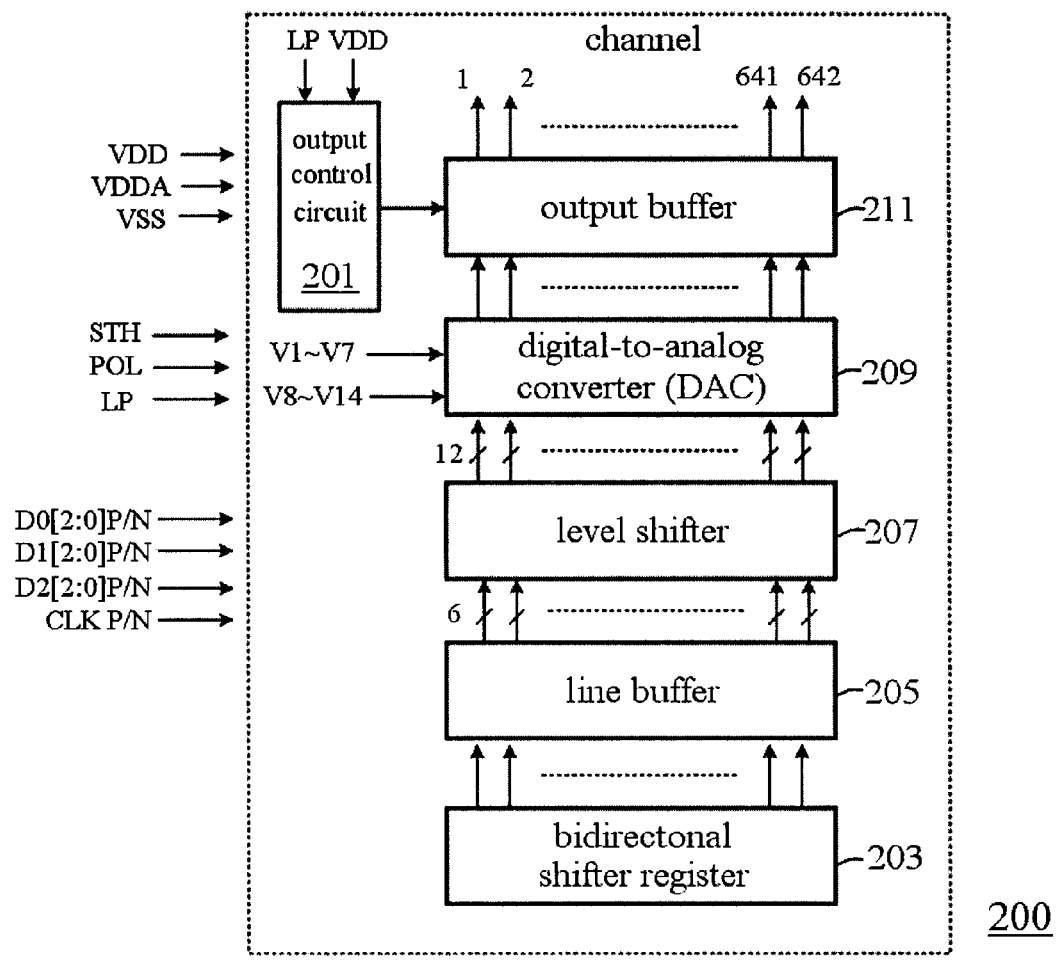
FIG. 2 illustrates a circuit diagram of source driver in the preferred embodiment of present invention.

Referring now to FIG. 2, a circuit diagram of source driver in the preferred embodiment of present invention is illustrated. As shown in the drawing, the source driver circuit of the present invention includes an output control circuit 201, a bidirectional shift register 203, a line buffer 205, level shifter 207, a digital-to-analog converter (DAC) 209, and a output buffer 211. First, the bidirectional shift register 203 in the embodiment inputs and registers a data signal in parallel or serial according to the received left-handed pulse or right-handed start pulse (DIO-L/DIO-R) and system clock. The data signal is transformed into the display data in parallel form and outputted after the acquisition of signal timing. The line buffer 205 in present invention may include red line buffer, green line buffer, and blue line buffer to process the image signals with R, Q B three primary colors. The line buffer can process the inputted data and execute the decouple step according to the sampling and hold rate (S/H). In the present embodiment, the line buffer 205 may latch the display data signal according to timing of the inputted horizontal synchronizing signal (Hsync) and simultaneously output the synchronizing 6 bits display data. During the signal cycle, the data signals of the pixel line are written into the line buffer 205 and are synchronously outputted with the output clock (OCLK) to the downstream component. The level shifter 207 may be optionally disposed between line buffer 205 and DAC 209 according to the desired potential level of the digital data signal. The level shifter 207 is used to shift the level of output signal latched by line buffer 205 for leveling the potential of digital data up to desired level. Thereafter, the potential-amplified digital data is outputted to a DAC 209 to perform the digital-to-analog conversion. Simultaneously, the pixel data is driven by DAC 209 to desired gamma voltage according to the provided gamma correction voltage (V1~V7 and V8~14 in the figure). In addition, a polarity signal POL is provided to controls the polarity (+/−) and polarity reversal of the pixel signal. Finally, the signal is outputted to each channel via output buffer 511. In the figure, the start pulse signal (STH) indicates the initial time of each pixel data for informing the source driver circuit to acquire the gamma signal (V1~V7 and V8~14). The polarity signal POL and start pulse signal STH may be formed from one or more external control circuits or control units (not shown). In the embodiment of present invention, one end of output buffer 211 is coupled with an output control circuit 201, which is used to control the switch of transistor in the output buffer for deciding whether to input the data signal to all channels coupled therewith. The components and structure of output control circuit 201 will be described in detail in the following embodiment. The power voltage VDDA in present embodiment is used to provide the required voltage for operating the source driver circuit. Both of the voltage sources VDD and VSS are applied to the output control circuit 201 for providing the signal to switch elements, wherein the voltage source VDD is a positive potential and VSS is a grounded or negative potential.

Figure 3:
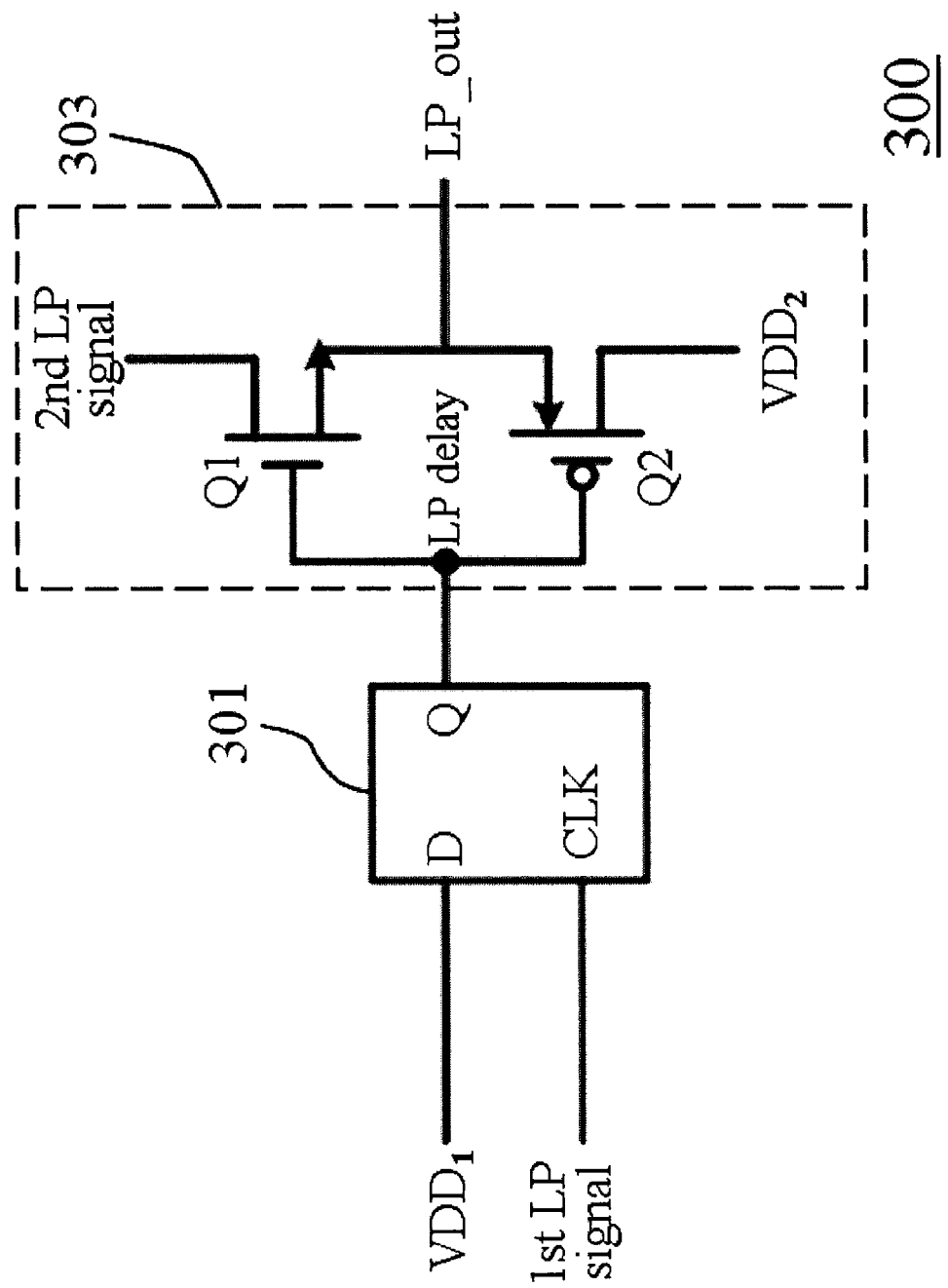
FIG. 3 illustrates the structure of output control circuit in present invention to control the output of the output buffer for eliminating the power-on noise.

Referring to FIG. 3, which illustrates the structure of output control circuit in present invention to control the output of the output buffer for eliminating the power-on noise. As shown in the FIG. 3, the output control circuit 300 of present invention includes a positive edge-triggered flip-flop (D flip-flop) 301 and CMOS switch element 303. The input end D of the flip-flop 301 is coupled with the digitalized logic voltage of the source driver circuit to receive a first data input signal $VDD_1$. The output end Q of the flip-flop 301 is coupled with the switch element 303, whose coupling point is denoted as LP delay. In addition, the LP control signal (which defined herein as first LP signal) once controlling the switch of inverted MOSFET 105 is used as a clock signal in flip flop 301. The switch element 303 is a CMOS semiconductor switch which is composed of a N-type MOSFET Q1 and a P-type MOSFET Q2. The LP delay signal outputted from the flip-flop 301 may be transmitted to the gate of transistor Q1 and Q2 respectively, thereby outputting a LP output signal, while the drain of transistor Q1 is coupled with the second LP signal, the drain of transistor Q2 is coupled with $VDD_2$. The source of the transistor Q1 and the source of the transistor Q2 are coupled together and share an output end. In the figure, when the clock of the first LP signal is shifted from low level to high level, the clock CLK begins to acquire the data signal. The data signal either in low level or high level will be outputted from LP delay.

Figure 4:
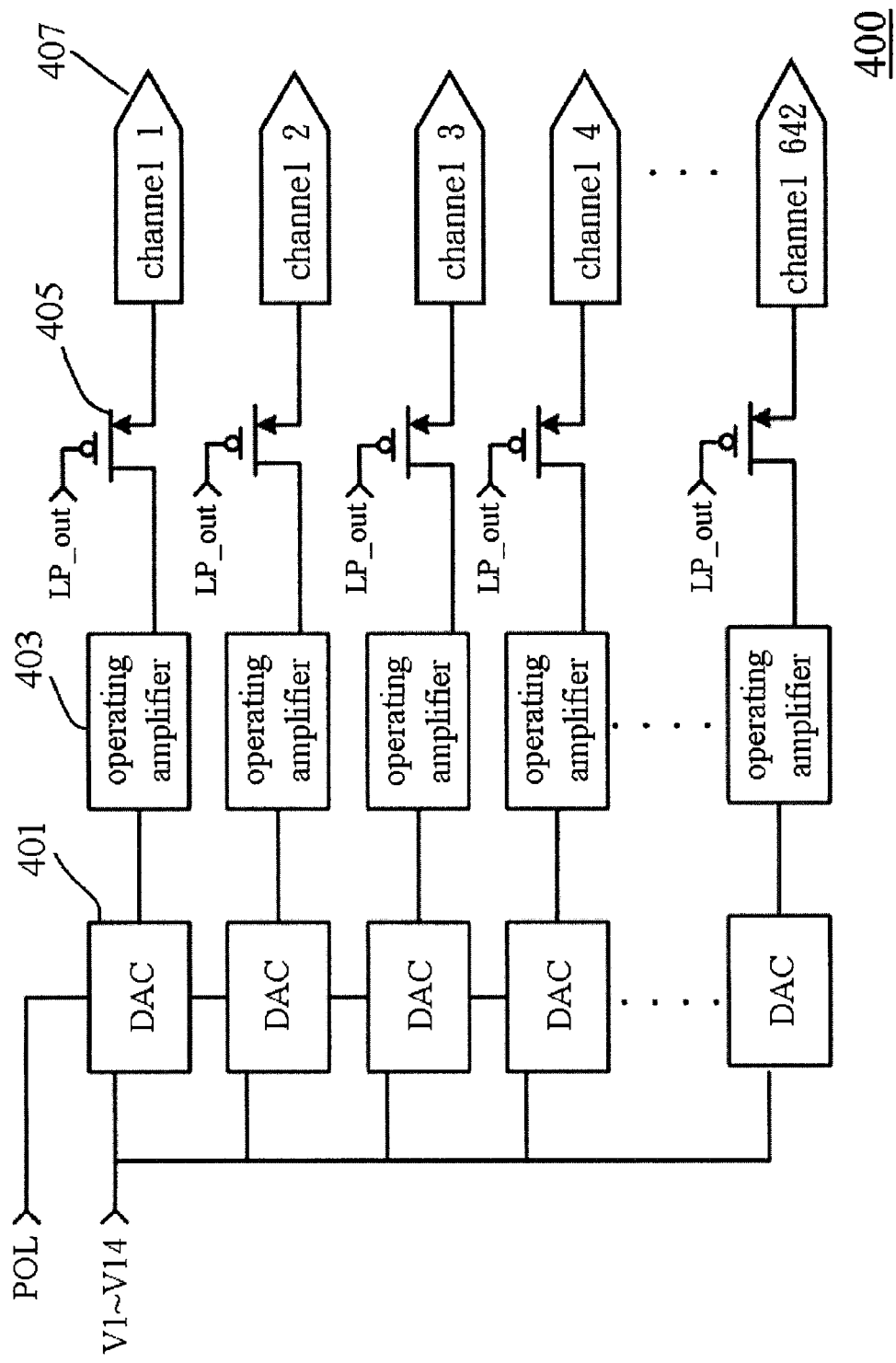
FIG. 4 illustrates the circuit diagram of the output control circuit used in the multi-channel source driver circuit in the embodiment of present invention.

Referring to FIG. 4, which illustrates the circuit diagram of the output control circuit 300 used in the multi-channel source driver circuit 400 in the embodiment of present invention. The output control circuit 300 replaces the original LP signal to the inverted MOSFET 405 with LP output signal (LP_out). As above-mentioned, the output control circuit 300 in FIG. 3 is coupled with the gate of inverted MOSFET 405 for replacing the LP signal with LP_out signal to control the switch of inverted MOSFET 405. The DAC 401 is coupled with multiple gamma correction voltages (V1~V14) and a polarity signal (POL) to transform the inputted digital data signal into analog data signal. The inputted data signal is then driven by operating amplifier 403 to the desired gamma correction voltage level for controlling the gamma performance of the corresponding pixels. The driven data signal is transmitted to the inverted P-MOSFETs 405 coupled therewith. The LP_out signal is used to control the switch of transistor 405 to cause the operating amplifier 403 to output correct, stable signal voltage to each channel 407. The switch of transistor 405 controlled by the LP_out signal will be described in detail in the following embodiment.

Figure 5:
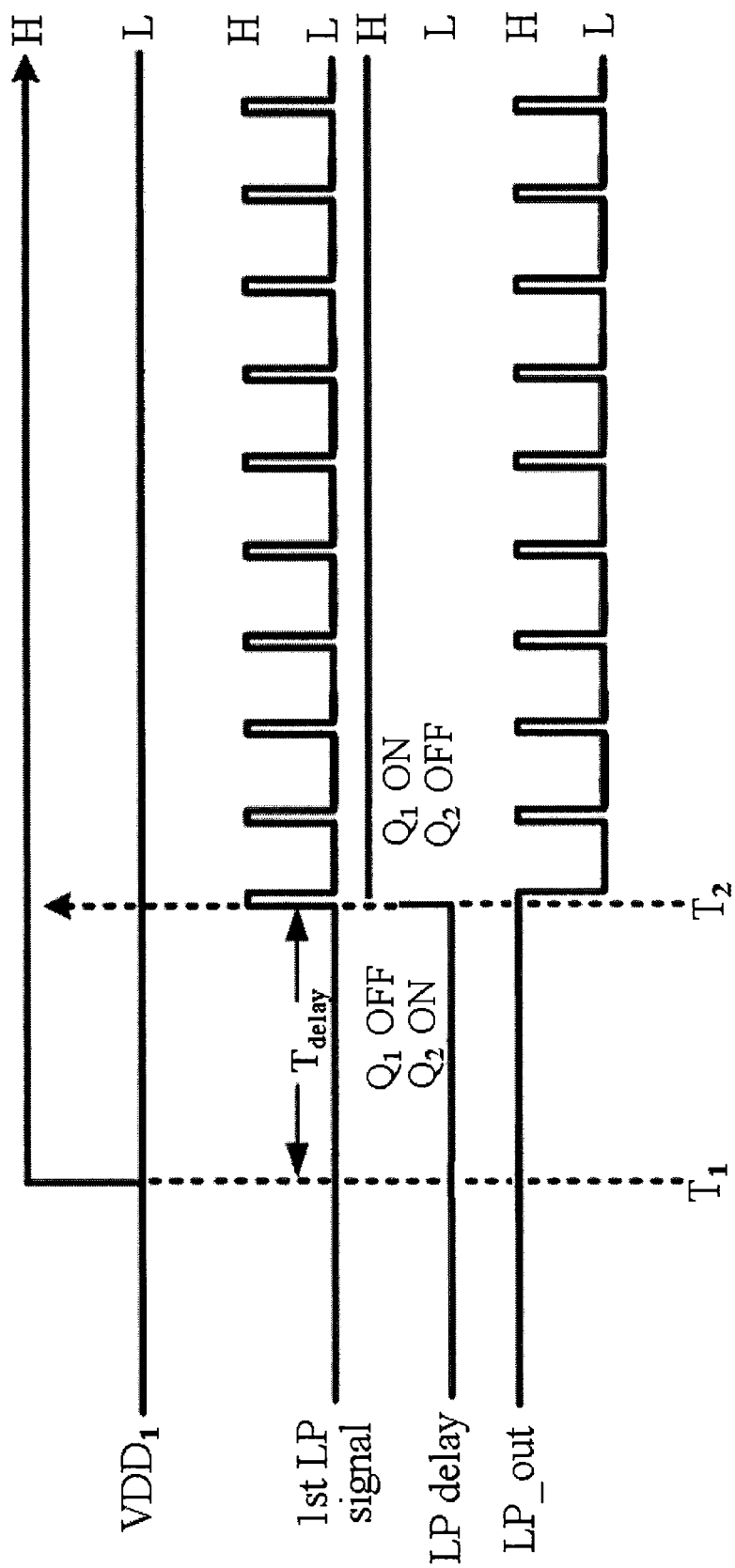
FIG. 5 illustrates the timing diagram of the signals in the output control circuit of FIG. 3.

Referring to FIG. 5, which illustrates the timing diagram of the signals in the output control circuit 300 of FIG. 3, including the data signal $VDD_1$, first LP signal, LP delay signal, and LP_out signal. As shown in figure, the data input signal is shifted from initial low level (initial L) to high level (initial H) when power-on $T_1$. The first LP signal (CLK) remains consistently in low level, thus the LP delay signal outputted from flip-flop 301 is in low level during the power-on ($T_1$~$T_2$). The LP delay signal mains in low level during this period such that the inverted MOSFET Q2 coupled with flip-flop is in ON state, while the MOSFET Q1 is in OFF state. Because the transistor Q2 is in ON state and the coupling of data signal $VDD_2$ with the source of transistor Q2, the voltage $VDD_2$ may be fed into the source of transistor Q2. Furthermore, because the $VDD_1$ and $VDD_2$ are identical signals in high level and the MOSFET Q1 is in OFF status, the LP_out signal of the output control circuit 300 in this period is in high level. Referring again to FIG. 4, the LP_out signal in high level cause the inverted MOSFET 105 to switch OFF in the period of $T_1$~$T_2$ for inhibiting the unknown signal voltage of operating amplifier 403 from transmitting to each channel 407 when the power-on, thereby solving the conventional power-on issue of the LCD displayer.

On the other hand, after the delay time $T_{delay}$, the original LP signal in FIG. 5 begins to output clock CLK at $T_2$. When the clock CLK is shifted from low level (L) to high level (H), the clock CLK begins to acquire data signal. Because the data signal $VDD_1$ herein is in high level (H), the LP delay signal of D flip-flop is also shifted from low level (L) to high level (H). The LP delay signal in high level (H) causes the MOSFET Q1 and inverted MOSFET Q2 to switch ON and switch OFF respectively. The transistor Q2 is in OFF status at this time such that the data signal $VDD_2$ can't feed into the source of transistor Q2, and the second LP signal may be inputted from the Source of transistor Q1. Therefore, the LP_out signal of the output control circuit 300 after $T_2$ is identical to the original inputted LP signal. Referring again to FIG. 4, the LP signal at this time controls the switch (On/OFF) of the inverted MOSFET 405 and causes the operating amplifier 403 to output stable signal voltage to each channel 407 and display normal image.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A source driver structure for displayer, comprising:
   a shift register which inputs and registers a data signal according to received pulse signal;
   a line buffer coupled with said shift register to receive said registered data signal, said line buffer latches said data signal according to inputted horizontal synchronizing signal (Hsync) and outputs a synchronizing display data;
   a level shifter coupled with said line buffer to drive said synchronizing display data to desired potential level and output;
   a digital-to-analog converter (DAC) coupled with said level shifter to transform said driven display data from digital form into analog form;
   an output buffer coupled with said digital-to-analog converter for outputting said converted display data to each channel; and
   an output control circuit coupled with said output buffer, comprising:
      a positive edge-triggered flip-flop receiving the digitalized logic voltage of said source driver structure and outputs a first output signal when triggered by a clock signal;
      a switch element coupled with said positive edge-triggered flip-flop, including a N-type MOSFET (Metal Oxide Semiconductor Field Effect Transistor) and a P-type MOSFET, wherein gate of said switch element is coupled with output end of said positive edge-triggered flip-flop to receive said first output signal, source of N-type MOSFET and source of P-type MOSFET share an output end to output a second output signal for controlling the switch of said output buffer, drain of said N-type MOSFET is coupled with said clock signal, drain of said P-type MOSFET is coupled with said digitalized logic voltage.

2. The source driver structure of claim 1, wherein said clock signal is a latch pulse.

3. The source driver structure of claim 1, wherein said first output signal is in low logic level in a predetermined time such that said N-type MOSFET and P-type MOSFET are in OFF and ON state respectively to output a second output signal in high logic level.

4. The source driver structure of claim 1, wherein said positive edge-triggered flip-flop is triggered by said clock signal after a predetermined time to output a first output signal in high logic level such that said N-type MOSFET and P-type MOSFET are in ON and OFF states respectively, the outputted second output signal at this time is said clock signal.

5. The source driver structure of claim 1, wherein output end of said output control circuit is coupled with said source driver structure for display to control the output of data signal from said source driver structure.

* * * * *